Nov. 28, 1939.   E. J. RICARD   2,181,204
ELECTRIC TOASTER WITH REMOVABLE HEATING ELEMENT
Filed Nov. 3, 1938   2 Sheets-Sheet 1

INVENTOR:
ELZEAR J. RICARD.
By Grover C. Hill,
ATTORNEY.

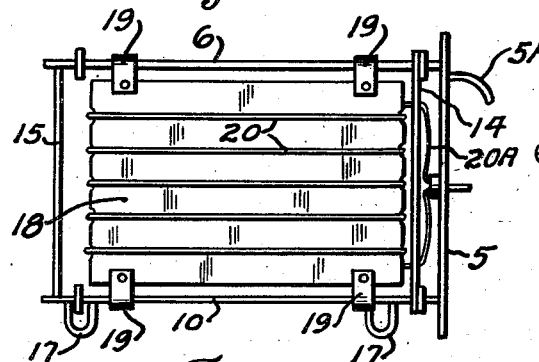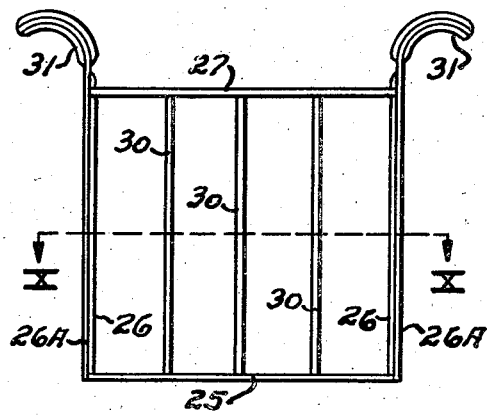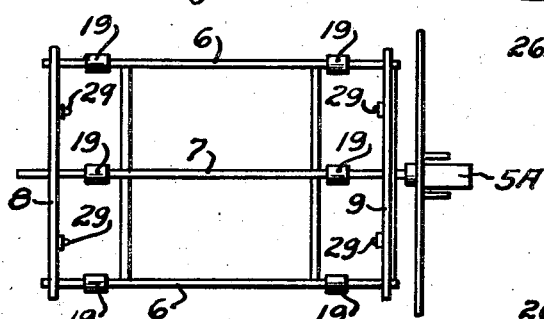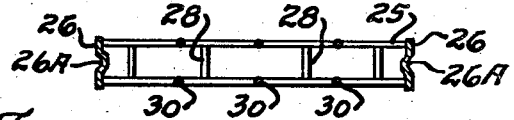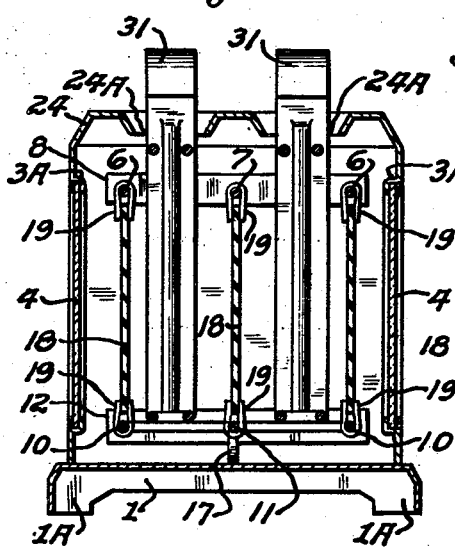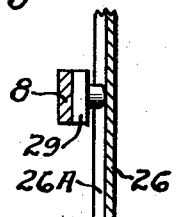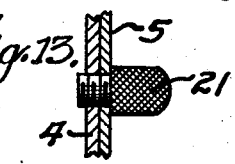

Patented Nov. 28, 1939

2,181,204

UNITED STATES PATENT OFFICE 2,181,204

ELECTRIC TOASTER WITH REMOVABLE HEATING ELEMENT

Elzear J. Ricard, Detroit, Mich., assignor of fifteen per cent to Fred C. Juergens, Detroit, Mich.

Application November 3, 1938, Serial No. 238,501

2 Claims. (Cl. 219—19)

This invention relates to improvements in the art of electrical household appliances and more particularly to electric toasters, and the principal object of the invention is to provide a toaster wherein the heating element unit is removable so that the device may be readily cleaned of falling crumbs and the like.

Another object of the invention is to carry out even a higher degree of efficiency in electric toasters having added features as characterized in an application covering a similar device filed November 3, 1938, Serial Number 238,502.

With the foregoing in mind, it will become readily apparent that the invention possesses further advantages, all of which will be clearly revealed during the course of the following detailed description, illustrated throughout the accompanying drawings, and more fully pointed out in the appended claims.

With reference to the drawings:

Figure 6 is a side elevation of the heating element unit; and Figure 7 is a top plan view thereof.

Figure 8 is a transverse section taken directly upon line VIII—VIII of Figure 3.

Figure 9 is a side elevation of one of the bread holders.

Figure 10 is a section taken upon line X—X of Figure 9.

Figure 11 is a sectional enlargement of a portion of one of the bread holders.

Figure 12 is a sectional enlargement of the bread holder sliding feature.

Figure 13 is an enlarged section showing one of the front plate fastening screws.

Figure 1:
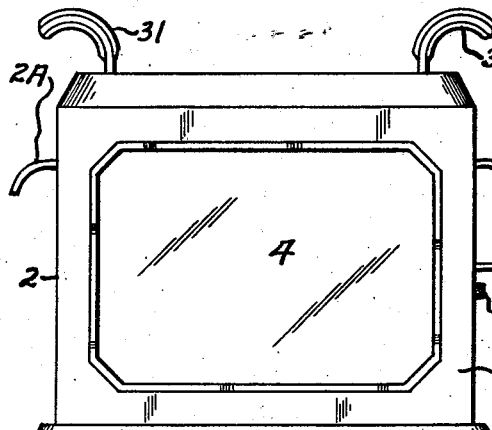
Figure 1 is a side elevation of the complete toaster.
Figure 2:
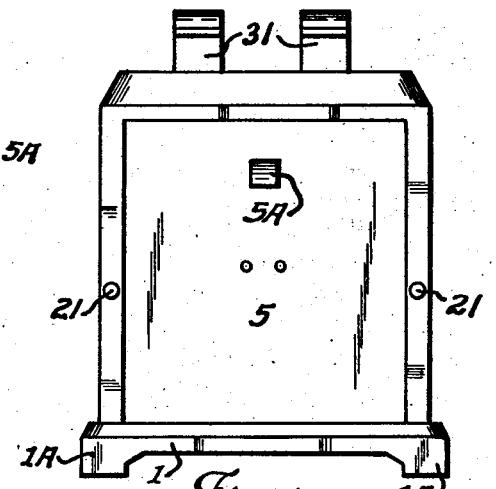
Figure 2 is a front elevation thereof.
Figure 3:
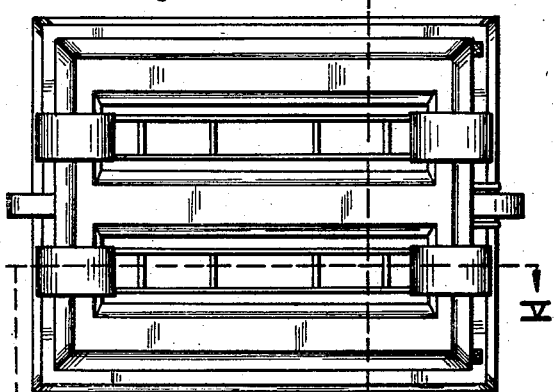
Figure 3 is a top plan view.

The invention consists of principal frame member having base 1 with legs 1A positioned at its respective corners as shown, and mounted upon said base in any approved manner is a metallic case having back 2, framed side openings 3 and framed front opening 32, and with particular reference to Figures 1 and 8 it follows that openings 3 are formed as at 3A so as to accommodate respective transparent plates 4, which are retained in position as shown in any approved manner.

A removable heating element unit is provided, and referring to Figures 6 and 7 it follows that said unit comprises vertically disposed front plate 5 with pull 5A where shown, and it is also noted in Figure 1 that pull 2A is secured to back 2 for a similar purpose. A frame for this unit is also provided and includes top rails 6 arranged in spaced apart parallel order, also central rail 7 connected to front plate 5 and to rear cross member 8 and also to front cross member 9 as indicated. Bottom rails 10 are provided and are arranged in spaced apart parallel order, also central bottom rail 11 arranged intermediate rails 10 as shown. Rail 11 is secured to front plate 5, to rear bottom cross member 12, and also to front bottom cross member 13. Front vertical bar 14 and rear vertical bar 15 are connected to rails 7 and 11, thereby rigidly holding the top and bottom portion of the heating element unit. In Figure 6 it is further noted that looped portions 17 are secured to rail 11 so as to support the frame of this unit.

Referring now more particularly to Figure 6 it follows that refractory plates 18 are provided and are secured to respective rails 6, 7 and 10 by means of clips 19 where indicated, and the purpose of plates 18 is to support a series of high resistance wires 20 which connect with wires 20A of an electric circuit.

It is now understood that the heating element unit is removable with respect to the principal frame, and said unit is rigidly held within said frame by means of screws 21 which are adapted to engage threaded apertures 22 within front 32 of the casing.

Figure 4:
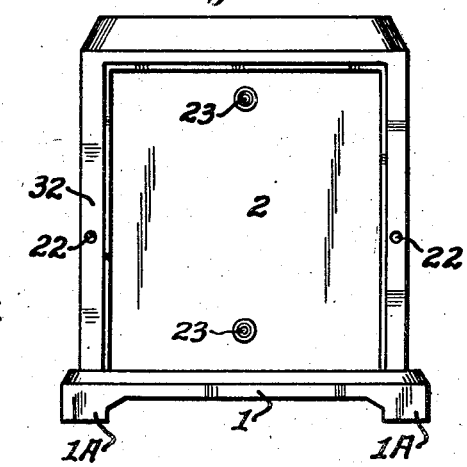
Figure 4 is a front elevation of the device with the heating element unit and bread holder removed.
Figure 5:
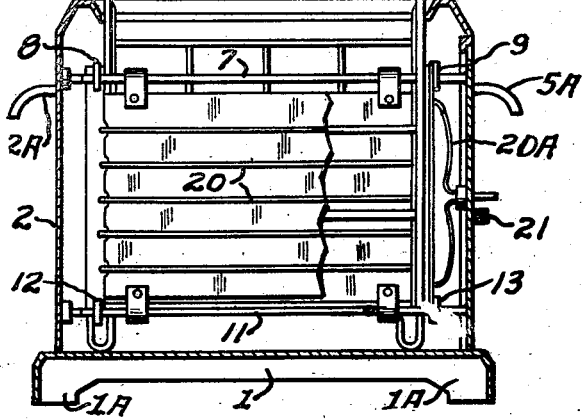
Figure 5 is a horizontal section taken directly upon line V—V of Figure 3.

In Figure 4 it is also observed that sockets 23 are secured to back 2 where shown, and the purpose of these sockets is that they constitute a suitable guide for the heating element unit by virtue of one of the ends of rails 7 and 11 slidably engaging them, thus holding said unit in a fixed relation with the casing of the device.

With reference to Figures 8 and 9 it is obvious that top 24 of the casing is provided with longitudinally disposed openings 24A so as to accommodate a similar member of bread holders, each of said holders is removable with respect to the heating element unit through openings 24A, and each comprises a frame having bottom 25, vertical sides 26 and top rails 27, also bottom cross members 28 where shown, and in Figure 10 it follows that sides 26 are each provided with channel 26A so that said holders may slidably engage respective ribs 29 upon cross members 8 and 12. Vertical rails 30 are secured to top rails 27 and to bottom 25, thus forming a complete inclosure for supporting bread within each of said holders and by virtue of cross members 28 there is passage within the bottom of the holders for bread crumbs as clearly indicated in Figure 10.

In Figure 9 it follows that each of sides 26 terminates at the top end thereof to deflected portions or handles, and each of said portions are covered with insulation 31, thus it is understood that portions 31 are adapted to suitable handles through which the bread holders may be inserted into the device and likewise removed therefrom.

It is now understood that by virtue of screws 21 the heating element unit is released so that it may be readily removed from the casing so that the device may be quickly cleaned of falling bread crumbs and the like, and likewise reinserted into said casing for continued use, and it is further understood that the pair of bread holders are adequate for supporting sliced bread and are inserted into the device and likewise removed at will.

Transparent plates 4 disposed within the sides of the casing render the bread in the process of being toasted clearly visible so that it may be timed to the proper consistency.

In conclusion it is understood that the disclosure herewith is merely illustrative so as to illustrate the general principle sought to be protected by Letters Patent, and that any modification of the invention made during any probable further development of the same for the market, would consistently fall within the scope of the claims.

Having thus fully described my invention, what I claim as new is:

1. In an electric toaster, a principal frame member and a casing mounted upon said member, a heating element unit, said unit comprising a vertical front plate, a horizontally disposed frame secured to said plate, said frame having a top central rail, a rail upon each side of said central rail and in spaced apart relation, a bottom central rail and a rail spaced upon each side thereof, a top front cross member and a top rear cross member, said cross members secured to all of aforesaid top rails, a bottom front cross member and a bottom rear cross member, said bottom cross members secured to all of aforesaid bottom rails, a front and a rear vertical bar supporting said rails and cross members, a vertically disposed refractory plate secured to said central rails, and a similar refractory plate secured to each pair of aforesaid side rails, said refractory plates adapted for respective heating elements in combination with an electric circuit.

2. In an electric toaster, a principal frame member, a casing mounted upon said member, a heating element unit coacting with said casing and removable with respect to the same, a pair of bread holders, each of said holders comprising a frame having side vertical rails, a bottom cross member and a pair of spaced apart top cross members, all of said cross members secured to said side rails, also a plurality of spaced apart horizontal rails secured to the side rails, each of said side rails having a channel therein parallel to the entire length thereof, a pair of ribs secured to aforesaid heating element unit, said channels adapted to slidably engage said ribs as the bread holders are inserted into said unit or removed therefrom, the top end of each of aforesaid side rails terminating to an outwardly deflected handle, and said handles being covered with insulating material.

ELZEAR J. RICARD.